United States Patent [19]

Latham

[11] Patent Number: 5,719,598

[45] Date of Patent: Feb. 17, 1998

[54] GRAPHICS PROCESSOR FOR PARALLEL PROCESSING A PLURALITY OF FIELDS OF VIEW FOR MULTIPLE VIDEO DISPLAYS

[75] Inventor: Roy Westlake Latham, Fremont, Calif.

[73] Assignee: Loral Aerospace Corporation, New York, N.Y.

[21] Appl. No.: 674,966

[22] Filed: Jul. 3, 1996

Related U.S. Application Data

[63] Continuation of Ser. No. 534,614, Sep. 25, 1995, abandoned, which is a continuation of Ser. No. 110,788, Aug. 23, 1993, abandoned.

[51] Int. Cl.$^6$ .................................................. G06F 13/00
[52] U.S. Cl. ........................ 345/419; 345/433; 345/505; 345/521
[58] Field of Search ........................ 395/118–9, 130–1, 395/135, 161–5, 133–9, 501–02, 505, 507–8

[56] References Cited

U.S. PATENT DOCUMENTS

| | | | |
|---|---|---|---|
| 4,945,500 | 7/1990 | Deering | 364/522 |
| 5,293,480 | 3/1994 | Miller et al. | 395/163 |
| 5,363,475 | 11/1994 | Baker et al. | 395/122 |
| 5,495,576 | 2/1996 | Ritchey | 395/125 |

OTHER PUBLICATIONS

Regan, Matthew and Pose, Ronald, "A Low Latency Virtual Reality Display System", *Technical Report No: 92/166; Department of Computer Science, Monash University, Australia*, Sep. 1992.

Reichlen, Bruce, "Sparcchair: A One Hundred Million Pixel Display", *Virtual Reality, IEEE 1993 International Symposium*, May 28, 1993.

Regan, et al, "An Interactive Graphics Display Architecture", *Virtual Reality, IEEE 1993 International Symposium*, Sep. 18, 1993.

Foley, James D., et al, "Computer Graphics: Principles and Practices", *Addison–Wesley Publishing Co.*, 2nd ed. pp. 855–911, 1990.

Galatowitsch, Sheila, "The human resources directorate: exploring the man/machine interface", *Defense Electronics*, v23, n11, p32(14), Nov., 1991.

Hopkins, Harry, "Making a scene: visual display systems can now be affordable as well as technically sophisticated", *Flight International*, v140, n4272,p44(3), Jun. 25, 1991.

Warwick, Graham, "Visible advance", *Flight International*, v139, n4248, p34(6),Jan. 2, 1991.

Duvanenko, Victor J., et al, "Algorithms for stereoscopic imaging: true 3–D is easier than it looks", *Dr. Dobb's Journal*, v18, n4, p18(8), Apr., 1993.

Atkin, P.; Ghee, S., "A transputer based mulit–user flight simulator", *Conference on Parallel Processing: Technology and Applications, Proceedings of the International Symposium* p.71–83, Oct. 1989.

*Primary Examiner*—Joseph H. Feild
*Assistant Examiner*—Rudolph Buchel
*Attorney, Agent, or Firm*—Douglas M. Clarkson

[57] ABSTRACT

An image generator system for producing real time imagery from a digital database includes processors performing in sequence: scene data management, geometry processing, and video processing. The scene data management processor selects and organizes the data base objects, modeled with polygons, and distributes polygons to parallel geometry processing modules. Geometry processing modules convert the images from 3-D to 2-D coordinates and divide the polygons into two-pixel-high scanline-aligned "spans". Spans are collected and sorted in a region buffer associated with each channel of a scene. Occlusion is done hierarchically to conserve time and bandwidth, and antialiasing is performed recursively for the same reasons.

10 Claims, 8 Drawing Sheets

GRAPHICS PROCESSOR FOR PARALLEL PROCESSING A PLURALITY OF FIELDS OF VIEW FOR MULTIPLE VIDEO DISPLAYS

This application is a continuation of prior complete application Ser. No. 08/534,614, filed Sep. 25, 1995, now abandoned, which is a continuation of application Ser. No. 08/110,778, filed Aug. 23, 1993, now abandoned.

FIELD OF THE INVENTION

This invention, generally, relates to computer graphics and in particular to image generators that use parallel processors to get increased throughputs.

BACKGROUND OF THE INVENTION

Computer graphics systems create images from digital databases composed of mathematically-described objects. A graphics system creates an image of the database as it would be if the objects were real and were viewed from a particular direction at particular points in space. Computer graphics systems have found broad utility in creating animated sequences used for science, entertainment and advertising; for interactive computer aided design; for flight simulation and training; and for many other applications.

Each image produced by a computer graphics system is a rectangular array of pixels. Each pixel is a small square having a uniform color or a uniform shade of gray. The quality of the image depends in part upon the size and number of pixels; large numbers of small pixels yield high resolution images. A computer graphics image may have as many as 1024×1280 pixels, or more.

Generating an image requires two types of processing, geometric processing and pixel processing. Geometric processing is the sequence of steps that converts the three dimensional object descriptions into two-dimensional object descriptions, with perspective and screen boundaries taken into account. Pixel processing subsequently converts two-dimensional object descriptions into individual pixels and combines arrays of pixels to form the pixel image. In many systems, the data for the final image is stored in a digital memory called a frame buffer. The frame buffer always contains the color or intensity data for each pixel, and it may contain additional data needed for intermediate steps of processing as well.

Because so many pixels must be generated and because each pixel requires many processing steps, making computer graphics images is among the most computationally intensive of widely-performed digital processing tasks. For images sequences produced for viewing in real time, at 15 to 60 frames per second, nearly all current applications require specialized hardware in the image generator.

For economy and simplicity, computer graphics practitioners have recognized that some form of parallel processing using identical modules, with each module being a combination of hardware and software, is a desirable implementation strategy for image generator design. The problem has been in finding a parallel processing scheme that is efficient and, at the same time, accommodates the implementation of advanced graphics features like antialiasing and the rendering of transparent objects.

Antialiasing is a means of improving image quality by computing and combining color contributions to a pixel from objects that only partially cover the pixel. Having a variable number of fractional contributions to a pixel proves to be a complicating factor to pipelined operations. Rendering transparent objects proves difficult because quality rendering requires the contributions of multiple transparency to be done in their distance order, rather than an arbitrary processing order.

Parallel processors should be evenly loaded for efficiency. Object processing generally is independent of how large the object ultimately appears in the final image, whereas pixel processing is directly proportional to how large the object will appear. For example, a triangle always has three vertices which will take the same amount of time to transform perspectively in the geometric processing whether the triangle ultimately covers only a few pixels or hundreds of thousands of pixels over a large fraction of the screen.

In fact, a many-sided polygon that poses a relatively large geometric processing load, nonetheless might cover few pixels and pose a relatively small pixel processing load. Since the geometric and pixel processing loads for each graphics object cannot be predetermined easily, a continuing challenge to all parallel processing schemes is to find out how to divide the geometric and pixel processing work among processors so that none are overloaded while others are idle.

An additional consideration is the widely acknowledged problem of frame buffer bandwidth. A well-known and useful concept in computer graphics, called Z-buffering, entails building an image pixel-by-pixel by checking whether each new potential color for a pixel comes from a portion of an object which is closer to the eyepoint than the contributions from portions of objects that were previously considered for the pixel.

Checking for the closer distance requires first reading the data stored previously in the frame buffer followed by writing new data back into the frame buffer. The state-of-the-art in digital memory technology is challenged for a frame buffer implementation when the number of pixels in an image is increased, or the rate of generating frames is increased, or the number of objects rendered into a frame buffer is increased, or a combination of these factors is used.

Previous efforts to develop an effective parallel processing strategy has included assigning one or more three-dimensional objects to each processor module, in which each processor module produces pixel data from the objects. The output stages of these processors must be pipelined so that pixel data from each processor is combined with pixel data from previous processors in order to perform occlusion.

For example, the data for the first pixel in the upper left corner of the image is passed from processor to processor in sequence. If any subsequent processor to the previous ones in the chain has data for the pixel, it must also perform a comparison with the previous data in order to avoid a difficulty.

Among the difficulties to be overcome with this strategy is the potential inefficiency of having objects of widely varying numbers of pixels distributed unevenly among the processors; then some processors will be idle while others have too many pixels to generate. Other challenges are antialiasing, which threatens to upset the processing of pixels at a fixed clock rate, and rendering transparent objects, which potentially demands that objects be assigned to processors in a particular order along the chain.

Another strategy to achieving parallel processing was to assign each processor to a predetermined region of the image screen, carrying out all steps from receipt of three-dimensional objects through pixel generation in the processor assigned to the region. This poses the problem of efficiently determining which objects are in which regions of the screen.

If each processor considers each object, much time is lost since some objects will ultimately prove to be outside the region. Moreover, there is still the problem of dramatically unequal loading.

Note, for example, that one processor might get a region of the screen image in the sky where there is only one pixel contribution from one object for each pixel; whereas another processor in the same scene might get a region of the image that has many buildings having complex occlusion and antialiasing. At best, complex load balancing mechanisms are required. Both problems of efficiency and load balancing get worse as the number of pixels in the image and the number of processors increase.

Yet another parallel processing strategy proposed the use of multiple whole-screen frame buffers. The idea was to use multiple processors with each computing of the whole screen, but each using only a fraction of the total number of objects.

The contributions to a pixel from each of the multiple screens then are combined. This avoids the inefficiency of each processor having to test each object for clipping to a subregion of a screen, and the balancing of a load for generating pixels is simplified somewhat.

However, that strategy incurs the inefficiency of having multiple whole-screen frame buffers for a single image, with each pixel of each frame buffer requiring substantial amounts of data to support the subsequent compositing upon output. Even if substantial data is stored per pixel, there appears to remain cases where the quality of transparency or antialiasing are nonetheless compromised.

Developing a parallel-processor image generator involves many considerations. Efficiency in both geometric and pixel processing are primary concerns, as is the avoidance of frame buffer bandwidth limits. Implementing antialiasing and correct rendering of transparent objects remain serious challenges.

The limitations of prior strategies is underscored by a continuing strong interest and by a continuing need for an effective solution to the problem.

OBJECTS AND SUMMARY OF THE INVENTION

An important object of the present invention is to provide an image generator that admits modular expandability and cost advantages of parallel processing.

Another object of the invention is to provide an image generator that can utilize more effectively the lower cost processors and the application-specific integrated circuit technology that is becoming more widely available today.

A further object of the invention is to provide the advantages of a Z-buffered system without frame buffer bandwidth limitations.

Additional objects and advantages will become apparent in the description that follows.

Briefly, the present invention involves an image generator system for producing real time imagery from a digital database having processors that perform in sequence: scene data management, geometry processing, and video processing. The scene data management processor selects and organizes the data base objects, modeled with polygons, and distributes polygons to parallel geometry processing modules. Geometry processing modules convert the images from 3-D to 2-D screen coordinates and divide the polygons into spans. Spans are collected and sorted, as received, in scanline order in a region buffer associated with each channel of imagery. Occlusion is done hierarchically, and antialiasing is performed recursively.

The above and other objects, features and advantages of the present invention will become more readily apparent from the following detailed description of the presently preferred embodiment as illustrated in the accompanying drawings.

DETAILED DESCRIPTION OF THE INVENTION

Certain terminology in the following detailed description is defined as follows:

A polygon in the context of this description is always planar and convex and, generally, is restricted to having three sides (a triangle) or four sides (a quad). The restriction to triangles and quads does not come into play in the occlusion algorithm theory embodied in the invention, but it will substantially simplify any implementation. In simulator parlance, a polygon is more commonly called a face.

A screen area is the two dimensional, usually rectangular, region of a generated image.

A scanline is a horizontal row of single pixels running the full width of the generated image.

A contiguous set of scanlines is called a scanstrip or more briefly, a scan. The number of scanlines in a scan, of course, is implementation dependent.

Each scan is conceived as a row of equal sized blocks. Each block is a rectangular portion of the screen and is a given number of pixels wide and the number of scanlines of the scan high.

The width of the blocks is implementation dependent. Blocks are fixed to the screen space, aligned vertically with the scans and are horizontally. The blocks of a scan are numbered from left to right in screen space.

A span is a data packet derived from a polygon in the three dimensional image generator database.

A domain of a span is the contiguous set of blocks of a scan that are covered or touched by the intersection of the scan and the projected screen image of the polygon. A domain is identified by the number of its first and last blocks.

The data of a span also contain an identifier of the polygon from which the span is derived and maximum and minimum Z values can be those of the polygon expressed in screen coordinates but may be the maximum and minimum values of a portion of the polygon over the scan.

A span also is obtained from an existing span by restricting the domain of the original span to a contiguous subset of this domain with or without modifying the Z values to conform to the minimum and maximum values of the polygon over this subset. Thus, the data in a span consists of a polygon identifier, domain delimiters (given by starting and ending block numbers), and the maximum and minimum Z values.

A block in the domain of a span is totally covered by the span if the polygon of the span is opaque, i.e., not partially translucency with no translucent texture, and the block is fully contained in the projected image of the polygon. Blocks in the domain of a span are partially covered if they are not totally covered.

A span is totally-covering if all the blocks of its domain are totally covered by the span. Partially-covering spans, therefore, are those that are not totally-covering.

An "update period" is the time used to compute a new image.

A "refresh period" is the time used to scan the display once, typically from top to bottom.

Figure 1:
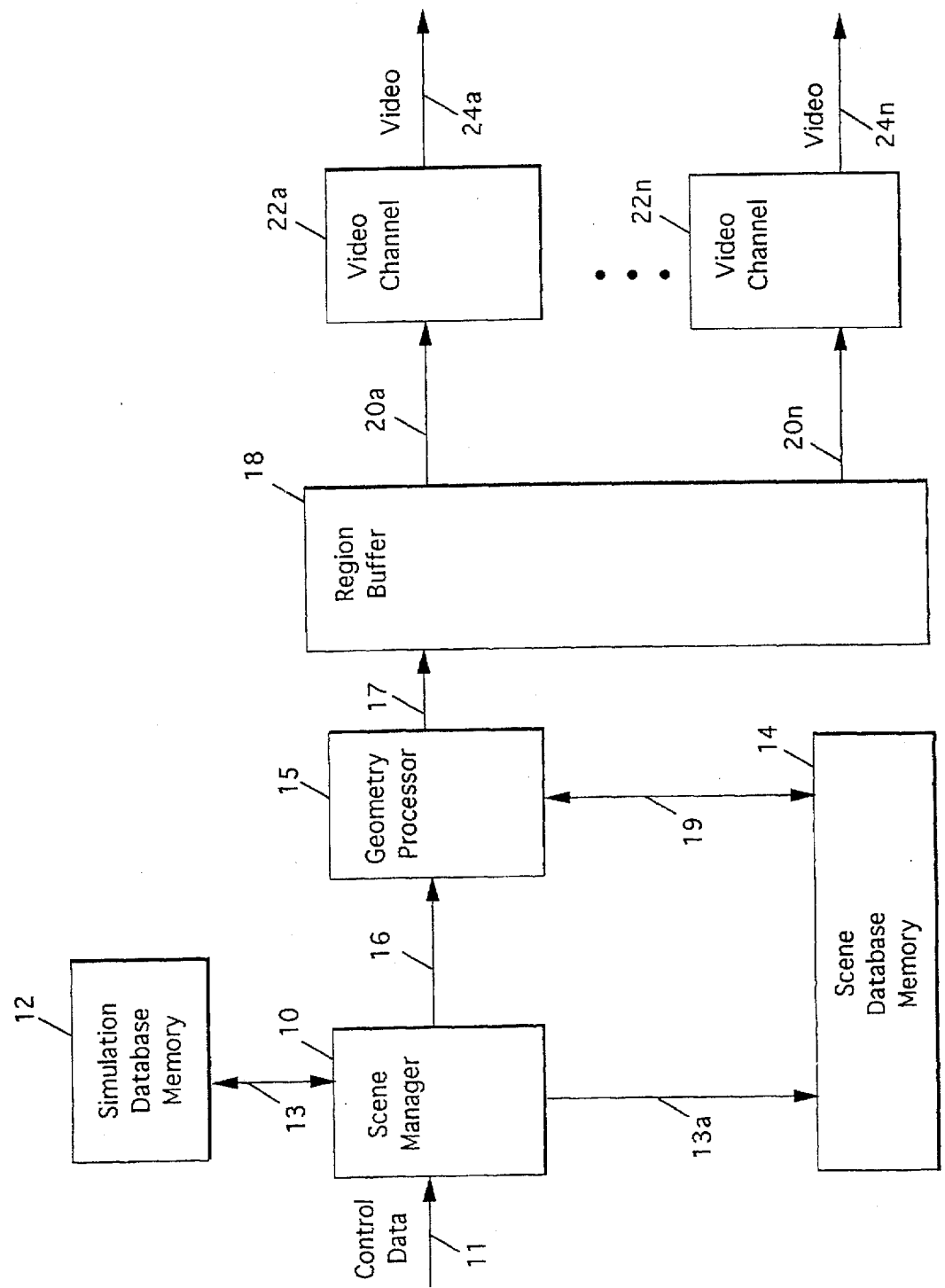
FIG. 1 illustrates a computer system that is connected and arranged according to the present invention.

With reference to FIG. 1 of the drawings, control data is received by a scene manager 10 from a host computer (not shown) via an interface 11. Host control data includes current position, attitude and field of view for each video channel, as well as position and attitude for each moving object to be viewed.

The scene manager 10 determines the potentially visible polygons, i.e., those polygons which are within the visibility range of a scene to be viewed. The potentially visible polygons are retrieved from a database memory 12 and transferred via a direct memory access 13 to the scene manager 10 and subsequently to a scene database memory 14 over a scene database direct memory interface 13a.

A subset of any polygons in the scene database memory 14 is determined by the scene manager 10 as a function of the field of view. The location of the polygons in the field of view in the scene database memory 14 is put into a list called the display list. The display list is partitioned into sublists such that the locations of polygons associated with each field of view are contiguous. Each sublist is processed in sequence.

Prior to the start of each update period, the respective sublists in the partitioned display list are transferred from the scene manager 10 to a geometry processor 15 via an interface 16. The geometry processor 15 performs any needed perspective computations on the polygons that will be in the field of view.

The perspective computations include translation, rotation, clipping, and projection calculations for each polygon in the display list. The resultant group of potentially visible polygons is transferred from the geometry processor 15 via an interface 17 to a region buffer 18 for storage pending the next scene update.

At the start of the next scene update, potentially visible polygons are transferred from the region buffer 18 to one of the video channels 22a–22n via an interface 20a–20n. The video channel selected will correspond to a field of view used during the geometric processing. In the video channels 22a–22n, occlusion is performed to determine which polygons or portions of polygons are occluded by other polygons or portions of other polygons.

The result is a group of visible polygons. Then, texture is added to specified visible polygons, and pixels are created for each polygon. Output from the video channels 22a–22n is "video" which is connected to displays (not shown) via respective interfaces 24a–24n.

Figure 2:
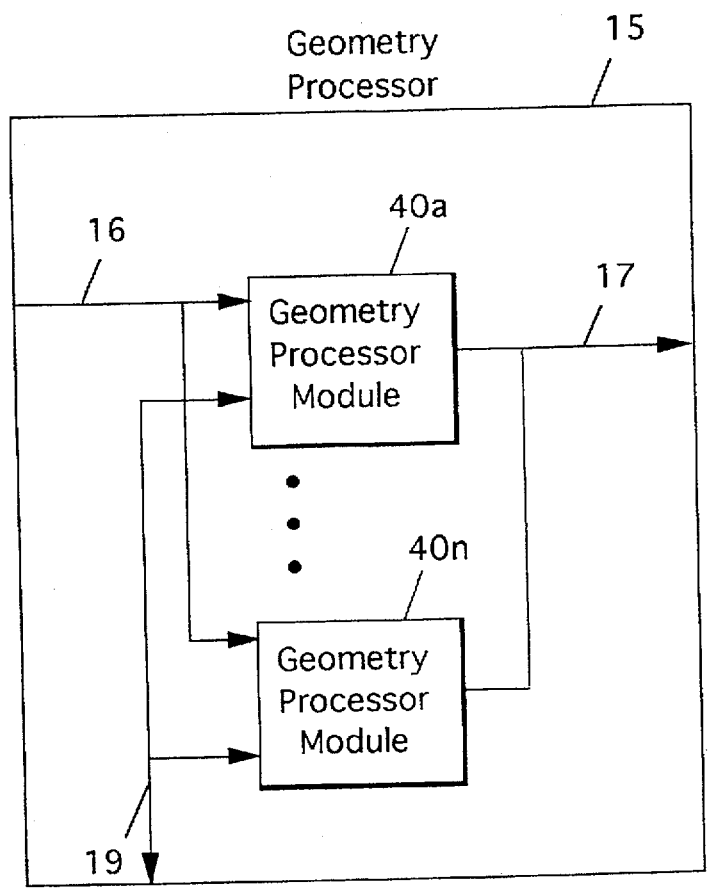
FIG. 2 illustrates a geometry processor in accordance with the present invention.

In FIG. 2, the geometry processor 15 is composed of multiple geometry processing modules 40a–40n. The geometry processor 15 processes each display sublist in the partitioned display list in sequence.

Figure 3:
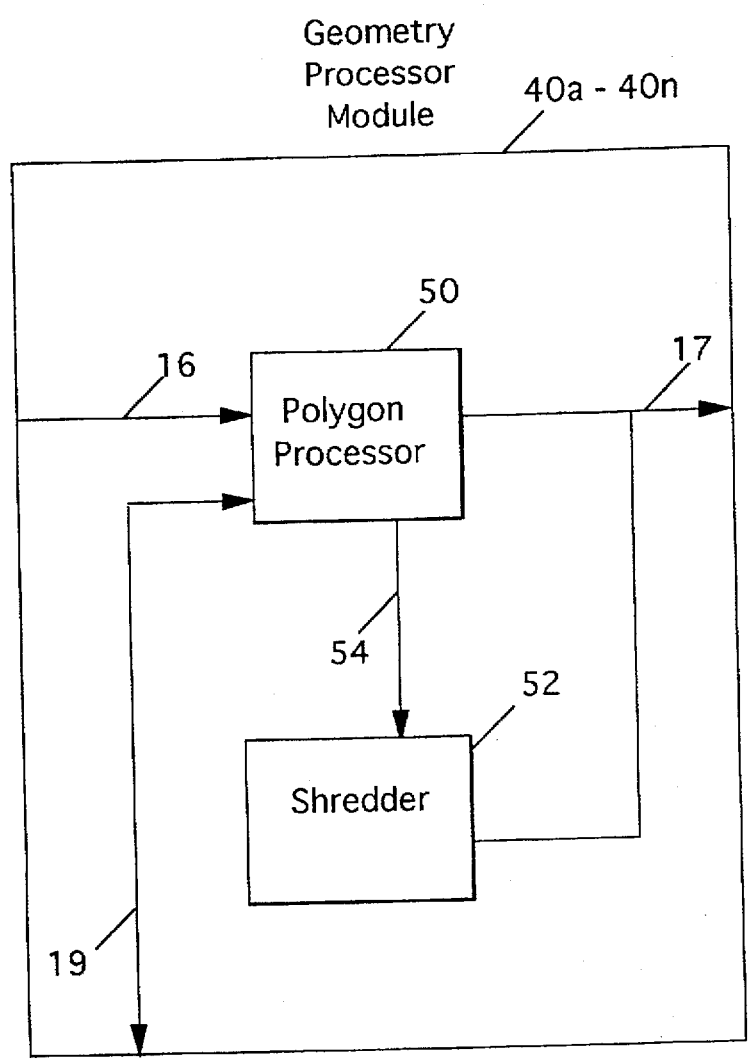
FIG. 3 illustrates a geometry processor module as used in the computer system of the invention.

In FIG. 3, each geometry processor module 40a–40n includes a polygon processor 50 that is connected via an interface 54 to a shredder 52.

Each entry in the display sublist is a set of commands related to the processing required for each polygon in the display sublist. These commands are distributed among the geometry processor modules 40a–40n to maximize the processing load distribution.

As the processing dictated by each display sublist is executed by a geometry processor module 40a–40n, the required polygon data is retrieved from the scene database memory 14 via the interface 19 and is loaded into the geometry processor module 40a–40n. The polygon processor 50 transforms dynamic and polygonal data into a window geometry, creating field of view specific texture matrices and illumination vectors.

The polygon processor 50, FIG. 3, discards polygons that are not visible in the field of view and clips remaining polygons to the region specified by the field of view. The polygon processor 50 also subdivides clipped polygons containing more than four vertices and performs 3D to 2D perspective transformations. The resultant data, called "transformed polygon data", then is sent to the shredder 52 via the interface 54.

The shredder 52 divides each polygon into spans. Each span has a height of two scanlines and a width determined by the maximum extent of the polygon on these two scanlines. This data from the shredder 52, on the interface 17, is "span boundary data", and data that is related to each polygon at the output of the polygon processor, 50, is "buffered polygon data".

Buffered polygon data consists of texture matrices, color, polygon plan equations, and other data related to the polygon. Span boundary data along with buffered polygon data are transferred to the region buffer 18 via the interface 17.

Figure 7:
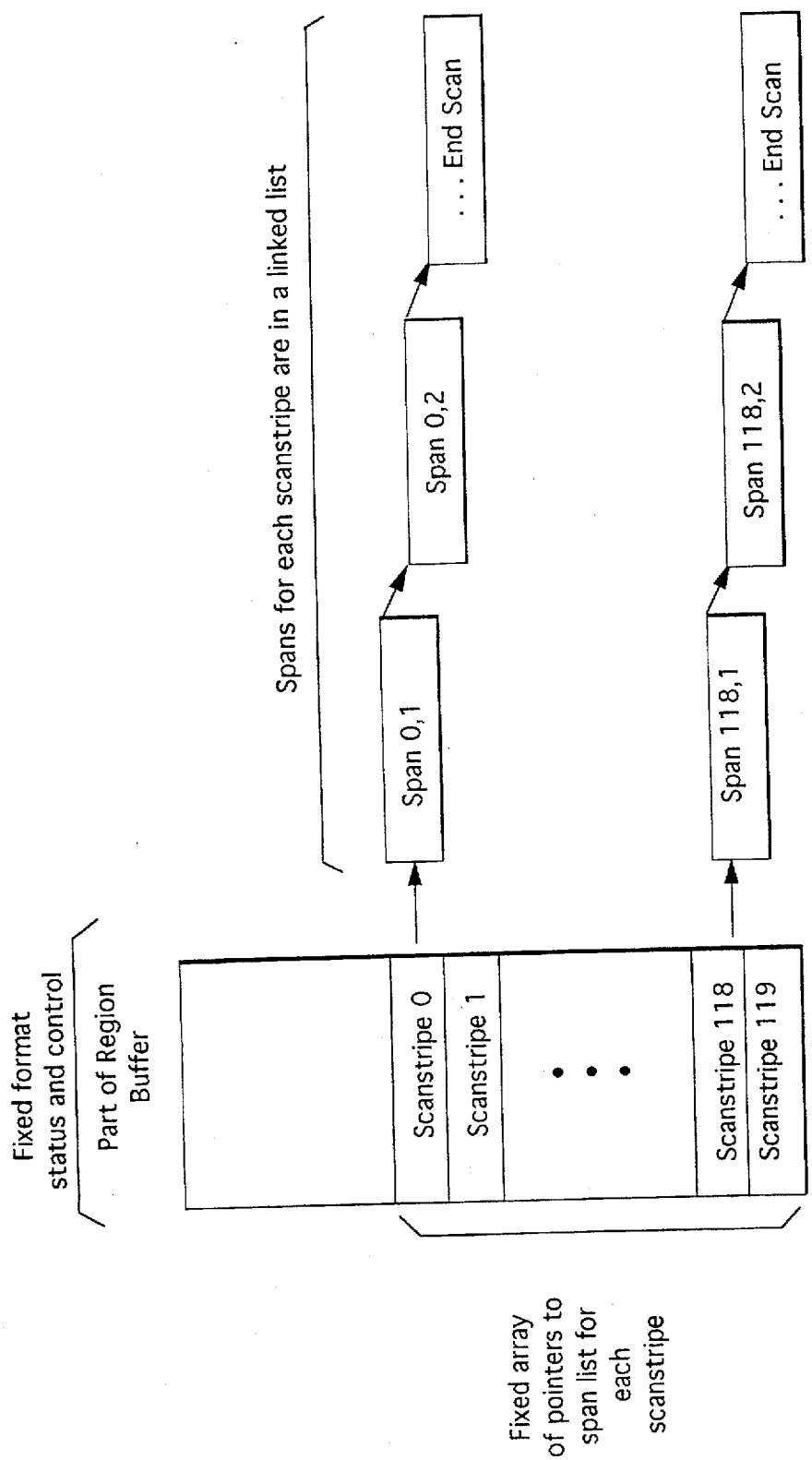
FIG. 7 is an illustration of the fixed format status and control with a frame of data followed by the fixed array of pointers to span list for each scanstrip.

FIG. 7 is an illustration of how an ordered linked list is created for each scanstrip within the region buffer 18. Details of the linked list creation are described in a co-pending application "Hierarchical Occlusion Processor for Image Generators" assigned to the same assignee as the present invention, which is incorporated herein by reference.

Figure 8:
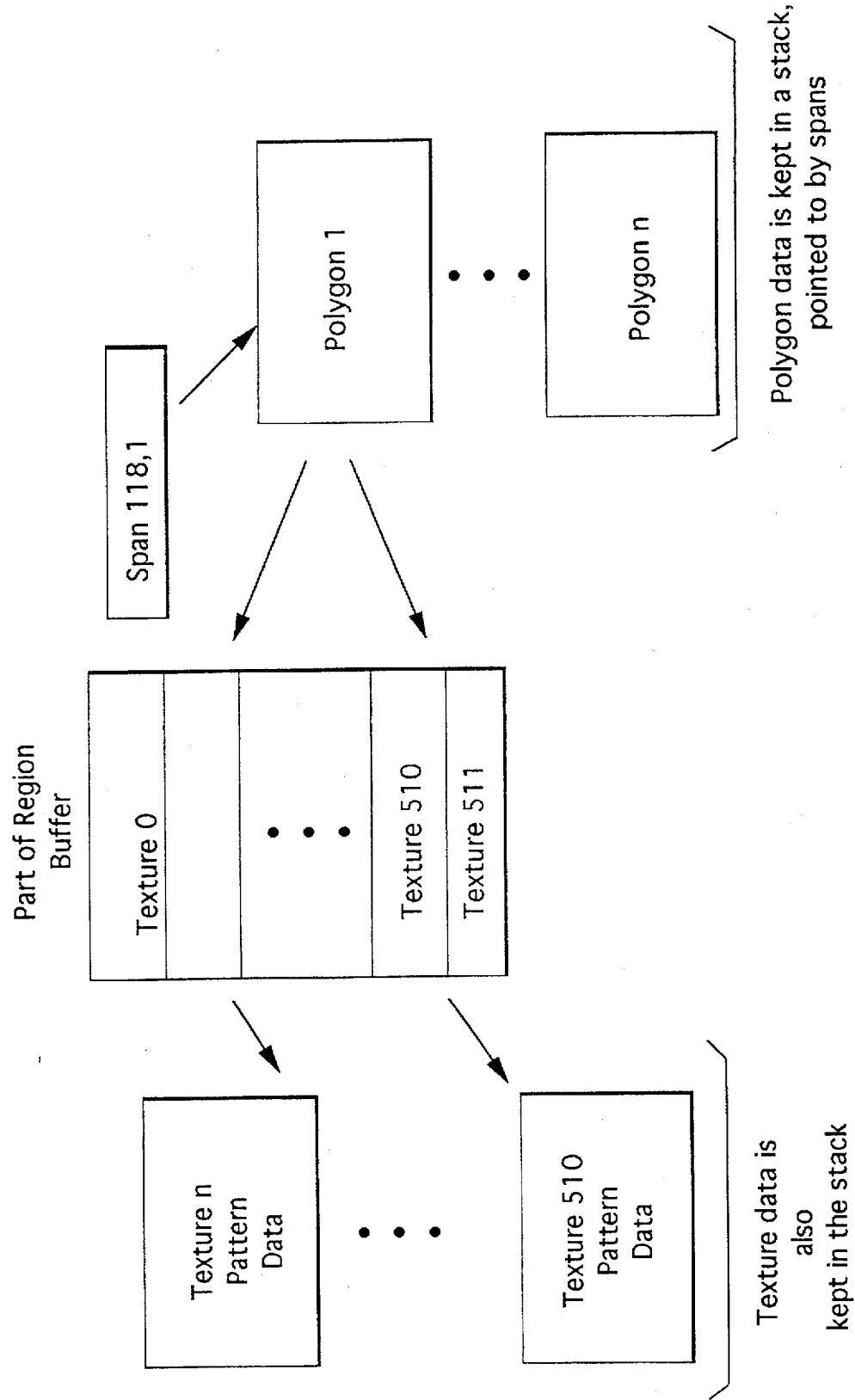
FIG. 8 shows how texture data lookup is accomplished according to the invention.

FIG. 8 illustrates how polygon data is stored in the region buffer 18 and is pointed to by the data for each span. Polygon data, in turn, points to texture data, that is stored also in the region buffer 18.

When span boundary data and buffered polygon data for the first span of a scanstrip are received and stored in the region buffer 18, a pointer is established with an address of the span boundary data and the buffered polygon data. Initially, an "end scan" flag in the span data pointer will be set to indicate that the span is, at least for now, also the last span on the scanstrip.

As subsequent span data is received, it is stored also in the region buffer 18, and similar span data pointers are created. When additional span data for a scanstrip is received by the region buffer 18, the span is integrated into the linked list for the scanstrip. The ordering is such that the left-most displayed span data occurs first, and the right-most displayed span data is last, with other spans in left-to-right order between them.

The end scan flag is set, or is reset, so that only the end scan flag associated with the right-most displayed span data is set. This flag is used by the region buffer 18 to read logic to control span data pointer readings. The ordered linked list is composed of one or more spans which, collectively, cover each scanstrip.

At the start of each subsequent update period, the region buffer 18 is toggled. Data stored in the region buffer 18 is transferred to a selected video channel 22a–22n via one of the interfaces 20a–20n. The selected video channel corresponds to the field of view used to process the polygon data in the geometry processor 15.

Figure 4:
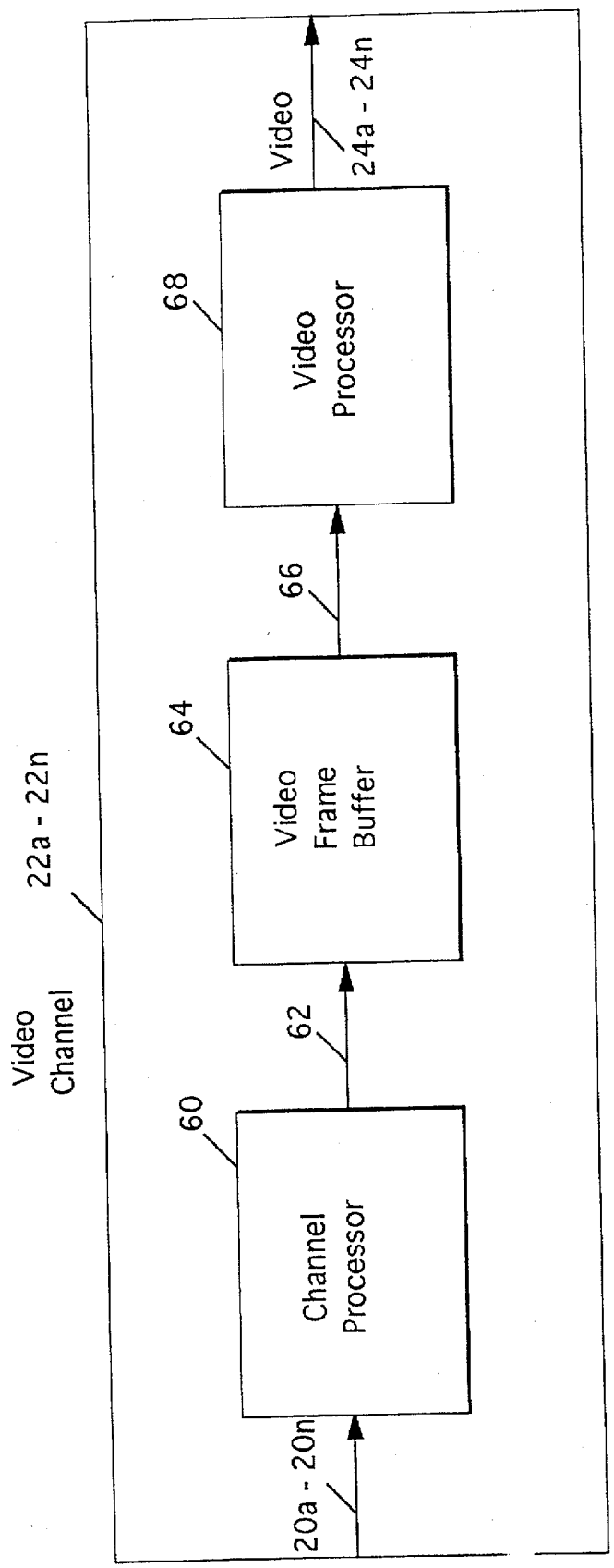
FIG. 4 illustrates one video channel that is arranged according to the present invention.

FIG. 4 illustrates each video channel 22a–22n which contains a channel processor 60, connected via an interface 62, to a video frame buffer 64. An interface 66 connects the video frame buffer 64 to a video processor 68 with its output interface 24a–24n.

Figure 5:
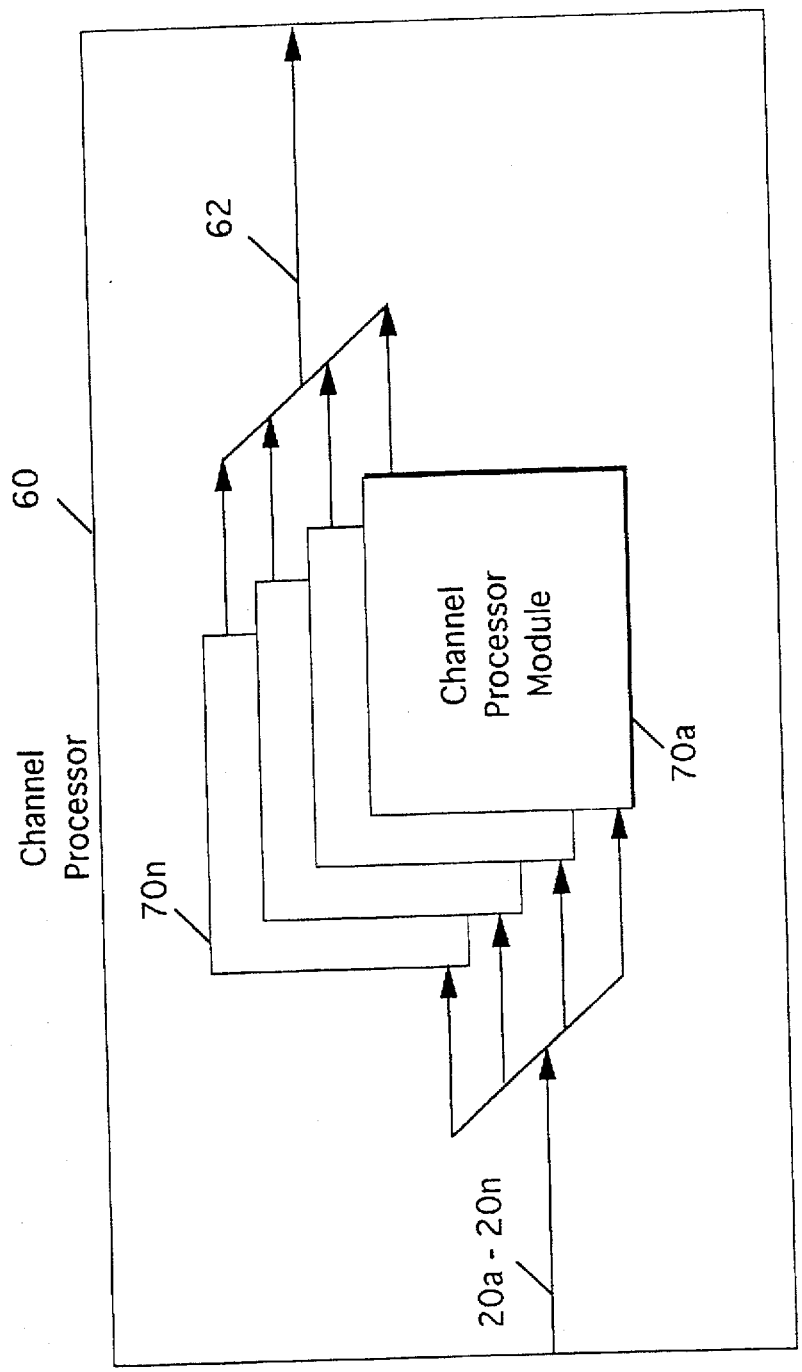
FIG. 5 illustrates a channel processor as connected according to the invention.

FIG. 5 is an illustration of each channel processor 60 consisting of multiple channel processor modules 70a–70n. The processing load is distributed among these channel processing modules 70a–70n to minimize processing bottlenecks.

Figure 6:
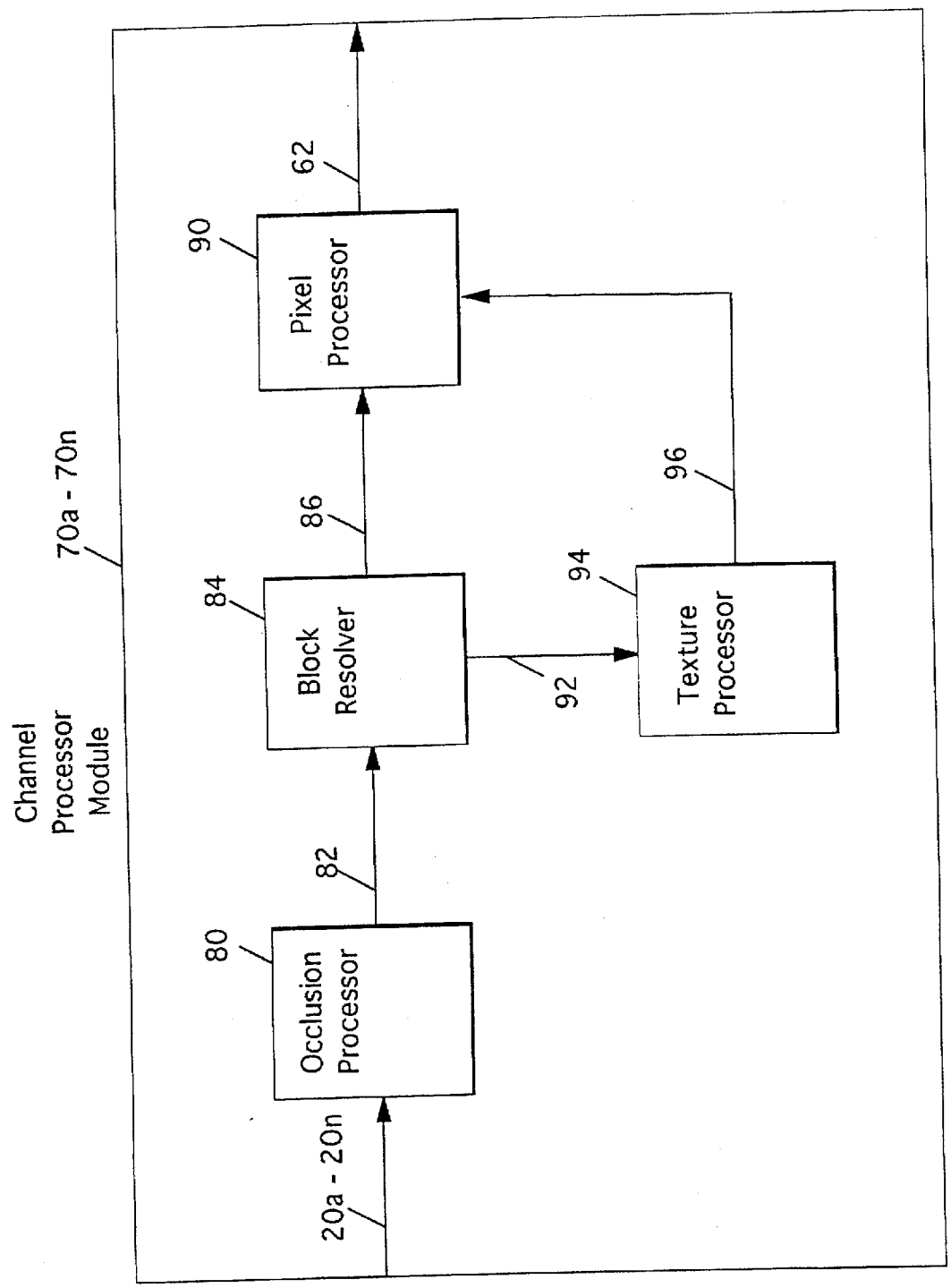
FIG. 6 illustrates a channel processor module that is used in accordance with the present invention.

In FIG. 6, the main elements of each channel processor module 70a–70n are illustrated. Using the data received from the region buffer 18, FIG. 1, the occlusion processor 80 computes the occlusion for each displayed pixel by producing for each pixel a set of subpixel masks corresponding to the polygons visibly covering each pixel.

Data from the occlusion processor 80 is transferred to the block resolver 84 via an interface 82. The block resolver 84 and the texture processor 94 compute the texture-space coordinates and levels.

They compute the addresses in the texture memory of up to eight texture modulations required for the pixel. They perform tri-linear interpolation to derive the block texture contribution to the pixel.

A pixel processor 90 performs the shading, fading and illumination computations for each polygon visible in each block, including the texture result. Then, antialiasing processing is performed. These involve computing the sum of the pixel contributions of all visible polygons, which is weighted according to the subpixel masks. The computed pixel values (pixel data) then are written into the video frame buffer 64 via an interface Back to FIG. 4, at the start of each update period, the video frame buffer 64 is toggled, so that pixel data is read from the video frame buffer 64 and is transferred to the video processor 68, via an interface 66 in scanline and pixel order. The video processor 68 performs gamma correction on the pixel data and converts the gamma corrected digital pixel data to analog video for output to the system displays via the interfaces 24a–24n.

The image generator may be implemented by connecting and arranging the respective circuits and interfaces as described and by including single-chip digital signal processors, such as the Intel i860, for the scene manager and for the geometry processor modules. Pixel processors may be implemented with a combination of digital signal processors, standard logic devices and application specific-integrated circuits (ASICs). ASIC products from LSI Logic, Inc. are suitable for the implementation.

The scene manager 10 preferably is implemented with a commercially available general purpose digital computer, and the database memory 12 is implemented preferably with any suitable magnetic disk that is commercially available.

Of course, other devices and circuit arrangements will occur to one skilled in this art in view of the above described invention.

The invention has been shown, described and illustrated in substantial detail with reference to a presently preferred embodiment. It will be understood by those skilled in this art that various changes and modifications may be made without departing from the spirit and scope of the invention which is set forth in the appended claims.

What is claimed is:

1. An image generator for producing pixel images from a digital database of three-dimensional object descriptions, said image generator comprising:

(a) scene manager means connected to a number of data memory means greater than one for determining polygons that are potentially visible in one of a plurality of fields of view to be displayed on one of a plurality of visual displays means;

at least one of said data memory means being adapted for storing said polygons as data in a display list of locations of said polygons in said field of view, said scene manager storing said display list in said one of said data memory means; and connection means for accessing said at least one data memory means periodically to transfer out data prior to a scene update;

(b) a plurality of geometry processor modules, each including shredder means, connected in parallel for receiving data from said scene manager means and from said data memory means prior to each of successive scene updates for transforming polygon data for each field of view;

means in each of said geometry processor modules for removing polygon data that will not be visible in said field of view, and for clipping remaining polygon data to said field of view;

each of said geometry processor modules including means for subdividing said clipped polygon data for 3D to 2D perspective transformation; and each of said geometry processor modules including hierarchical occlusion and antialiasing means for converting said polygon data;

(c) at least one region buffer means for storing transformed polygon data associated with contiguous regions of a visual display means including means for toggling stored data to a selected video channel processor means; and (d) a plurality of video channel processor means each connected with said at least one region buffer means for processing transformed polygon data into pixel image data on a visual display means associated with said field of view determined by said scene manager means.

2. The image generator as defined by claim 1 wherein each of said plurality of geometry processor modules is connected to perform texture modification to predetermined polygons of data selected for visibility.

3. The image generator as defined by claim 1 wherein said display list of polygon data is subdivided into sublists such that the locations of the polygons are contiguous.

4. The image generator as defined by claim 1 including means connecting polygon processor means within each of said geometry processor modules to said shredder means to transfer said transformed polygon data for dividing each polygon into a span of a predetermined height and width, said height being at least two scan lines.

5. The image generator as defined by claim 1 including a plurality of occlusion processor means connected to receive output from said plurality of video channel processor means for producing a set of subpixel masks corresponding to polygon visibility within a scene to be displayed.

6. An image generator for producing pixel images from a digital database of three dimensional object descriptions, said image generator comprising:

geometry processor means including at least one region buffer means associated with a contiguous region of one of a plurality of visual displays, including a means for selecting video processor based on the field of view associated with said contiguous region said visual display, means for accessing said three dimensional object descriptions including means for creating display lists of three dimensional objects within said field of view, means for converting said three dimensional object descriptions into two dimensional object descriptions, means for clipping said two dimensional object descriptions into each region of said visual display associated with a region buffer, and means for transferring said clipped two dimensional object descriptions by region into said at least one region buffer;

a plurality of channel processor means, each channel processor associated with a field of view, for processing two dimensional object descriptions associated with that field of view including frame buffer means and a plurality of pixel processor module means, each of said pixel processor module means including means for accessing said two dimensional object descriptions from at least one of said region buffer means, hierarchical occlusion and antialiasing means having a top level corresponding to the region buffer being accessed, and means for converting said two dimensional object descriptions into pixel data; and a plurality of video processor means, each video processor means connected to a visual display means which is associated with a field of view, for reading out said frame buffer means in row order for transferring a completed pixel image.

7. An image generator as defined by claim 6 wherein each of said channel processor means includes means for converting said object descriptions into mask data, and means for converting pixel and mask data into anti-aliased pixels.

8. An image generator as defined by claim 7 including means for writing said antialiased pixels into said frame buffer means.

9. An image generator as defined by claim 6 wherein each of said geometry processor means includes identical geometry processor modules connected in parallel.

10. An image generator as defined by claim 6 wherein each contiguous region of said visual display includes a predetermined number of scanstrips.

* * * * *